United States Patent [19]

Noomen et al.

[11] Patent Number: 5,266,630
[45] Date of Patent: Nov. 30, 1993

[54] AQUEOUS COATING COMPOSITION CONTAINING A FUNCTIONAL ORGANIC COMPOUND, A CURING AGENT, AND A DISPERSING AGENT

[75] Inventors: Arie Noomen; Petrus J. Peters, both of Voorhout, Netherlands

[73] Assignee: Akzo NV, Arnhem, Netherlands

[21] Appl. No.: 100,688

[22] Filed: Sep. 24, 1987

[30] Foreign Application Priority Data

Sep. 24, 1986 [NL] Netherlands ............ 8602411
Jul. 20, 1987 [NL] Netherlands ............ 8701707

[51] Int. Cl.$^5$ ............................................. C08K 5/16
[52] U.S. Cl. ........................... 524/714; 524/821; 525/259; 525/426
[58] Field of Search ........... 524/457, 811, 714, 259, 524/821; 525/426

[56] References Cited

U.S. PATENT DOCUMENTS

| | | | |
|---|---|---|---|
| 3,474,056 | 10/1969 | Schneider et al. | 524/904 |
| 4,317,894 | 3/1982 | Lewarchik et al. | 525/426 |
| 4,359,556 | 11/1982 | Lakshmanan et al. | 525/426 |
| 4,598,108 | 7/1986 | Hoefs | 525/113 |
| 4,772,680 | 9/1988 | Noomen et al. | 528/229 |

FOREIGN PATENT DOCUMENTS 2075022 11/1981 United Kingdom ............ 524/259

*Primary Examiner*—John C. Bleutge
*Assistant Examiner*—Mark Sweet
*Attorney, Agent, or Firm*—James K. Poole; Louis A. Morris

[57] ABSTRACT

The invention provides an aqueous coating composition curable at ambient temperature comprising a compound having at least $2\alpha,\beta$-ethylenically unsaturated carboxylate groups; a polyamino amide having an amine number ranging from 60-1000; and either a nitroalkane, a formic acid ester, or an organic compound occurring in at least 2 tautomeric forms, and in one of the tautomeric forms a labile hydrogen atom is linked to a carbon atom. A process of coating a substrate with such composition is also provided.

34 Claims, No Drawings

AQUEOUS COATING COMPOSITION CONTAINING A FUNCTIONAL ORGANIC COMPOUND, A CURING AGENT, AND A DISPERSING AGENT

The invention relates to an aqueous coating composition based on an organic compound and a curing agent for it. Aqueous compositions have the important advantage that upon application to or upon use of a co-solvent only little organic solvent is released into the atmosphere. Moreover, the use of water leads to fewer physiological drawbacks and fire and explosion hazards.

The coating composition according to the invention is characterized in that the organic compound is a compound having at least $2\alpha,\beta$-ethylenically unsaturated carboxylate groups and the curing agent is a polyamino amide having an amine number of 60–1000 built up from a mono- and/or dicarboxylic acid having 2–40 carbon atoms and a polyamine having 2–6 primary amino groups and 2–20 carbon atoms, and the coating composition further comprises a nitroalkane having 1–6 carbon atoms, an organic compound occurring in at least 2 tautomeric forms, and in one of the tautomeric forms a labile hydrogen atom is linked to a carbon atom and which compound contains at least one carbonyloxy group or sulphonyl group, and/or a formic acid ester having a solubility of at least 0.2 g in 100 g of water having a temperature of 20° C., with the exception of tert.butyl formiate.

It should be noted that European Patent Application No. 55477 discloses an aqueous composition the binder of which is a copolymer built up from an ethylenic monomer and a mixture of aromatic compounds containing on average at least 0.5 epoxy groups and on an average of from 0.1 to 0.5 (meth)acryloyl groups per molecule. The copolymer thus obtained contains acidic moieties providing water dispersibility when reacted with a basic compound such as an amine. The composition may also contain a crosslinking agent such as a polyamino amide, said agent being a compound having functional groups capable of reacting with an epoxy group or hydroxy group derived from an epoxy group of the copolymer. So, it is clear that the crosslinking reaction occurs between an amino group of an polyamino amide and the epoxy group or hydroxy group of the copolymer. In the crosslinking reaction according to the present invention, however, an amino group is added to the carbon atoms of the ethylenically unsaturated group of the $\alpha,\beta$-ethylenically unsaturated carboxylate group.

As representative examples of compounds having at least $2\alpha,\beta$-ethylenically unsaturated carboxylate groups may be mentioned the (meth)acrylic esters of di-, tri- or polyvalent polyols, including polyester polyols and polyether polyols, alkyd resins and hydroxy functional (meth)acrylic or vinyl (co)polymer resins; adducts of a hydroxyl group-containing (meth)acrylic ester of a polyol on the one hand to an at least bifunctional isocyanate compound on the other; and adducts of (meth)acrylic acid to an at least bifunctional epoxy compound. For brevity, the compounds envisaged are referred to hereinafter as poly(meth)acryloyl compound.

As examples of suitable (meth)acrylic esters of di-, tri- or polyvalent hydroxyl compounds may be mentioned those of ethylene glycol, propylene glycol, diethylene glycol, tetramethylene diol, neopentyl glycol, hexamethylene diol, cyclohexane diol, bis-(4-hydroxycyclohexyl) methane, glycerol, trimethylol ethane, trimethylol propane and pentaerythritol. These esters may optionally contain a hydroxyl group. Such polyols and other suitable hydroxyl compounds, such as polyester diols and polyols and polyether diols and polyols, alkyd resins and hydroxyl functional (meth)acrylic or vinyl (co)polymer resins are described, among other places, in Lackkunstharze by H. Wagner and H. F. Sarx, 5$^{th}$ Ed., 1971 (Carl Hanser Verlag, München).

The hydroxyl group-containing (meth)acrylic esters on the basis of which the adduct to the at least bifunctional isocyanate compound or epoxy compound is formed are (meth)acrylic esters of polyols as also described in the afore-going. It is preferred that use should be made of acrylic esters of hydroxyl compounds having 2–6 hydroxyl groups and 2–10 carbon atoms, such as acrylic esters of dimethylol cyclohexane, ethylene glycol, hexane diol, glycerol, trimethylol propane, pentaerythritol and dipentaerythritol. More particularly, use is made of trimethylol propane diacrylate or pentaerythritol triacrylate.

As examples of at least bifunctional isocyanate compounds which may be used for the above-envisaged adduct may be mentioned aliphatic, cycloaliphatic or aromatic di-, tri- or tetraisocyanates that may or may not be ethylenically unsaturated, such as 1,2-propylene diisocyanate, trimethylene diisocyanate, tetramethylene diisocyanate, 2,4,4-trimethyl hexamethylene diisocyanate, dodecamethylene diisocyanate, $\omega,\omega'$-dipropylether diisocyanate, 1,3-cyclopentane diisocyanate, 1,2-cyclohexane diisocyanate, 1,4-cyclohexane diisocyanate, isophorone diisocyanate, 4-methyl-1,3-diisocyanatocyclohexane, trans-vinylidene diisocyanate, dicyclohexyl ethane-4,4'-diisocyanate, 3,3'-dimethyl-dicyclohexyl methane-4,4'-diisocyanate, a toluene diisocyanate, 1,3-bis(isocyanatomethyl)benzene, a xylylene diisocyanate, 1,5-dimethyl-2,4-bis-(isocyanatomethyl)benzene, 1,5-dimethyl-2,4-bis(2-isocyanatoethyl)benzene, 1,3,5-triethyl-2,4-bis(isocyanatomethyl) benzene, 4,4'-diisocyanato diphenyl, 3,3'-dichloro-4,4'-diisocyanatodiphenyl, 3,3'-diphenyl-4,4'-diisocyanatodiphenyl, 3,3'-dimethoxy-4,4'-diisocyanatodiphenyl, 4,4'-diisocyanatodiphenyl methane, 3,3'-dimethyl-4,4'-diisocyanatodiphenyl methane, a diisocyanatonaphthalene, the adduct of 2 molecules of a diisocyanate, for example hexamethylene diisocyanate or isophorone diisocyanate, and a diol such as ethylene glycol, the adduct of 3 molecules of hexamethylene diisocyanate and 1 molecule of water (available under the trade mark Desmodur N of Bayer), the adduct of 1 molecule of trimethylol propane and 3 molecules of toluene diisocyanate (available under the trade mark Desmodur L of Bayer), the adduct of 1 molecule of trimethylol propane and 3 molecules of isophorone diisocyanate, compounds such as 1,3,5-triisocyanatobenzene and 2,4,6-triisocyanatotoluene, and the adduct of 1 molecule of pentaerythritol and 4 molecules of toluene diisocyanate. It is preferred that use should be made of an aliphatic or cycloaliphatic di- or triisocyanate containing 8–36 carbon atoms.

As examples of the at least bifunctional solid or liquid epoxy compounds that may be used for the above-envisaged adduct may be mentioned the di- or polyglycidyl ethers of (cyclo)aliphatic or aromatic hydroxyl compounds such as ethylene glycol, glycerol, cyclohexane diol, mononuclear di- or polyvalent phenols, bisphenols, such as Bisphenol-A and Bisphenol-F, and polynuclear phenols; polyglycidyl ethers of phenol formaldehyde novolak; epoxidized and optionally, subsequently, hydrogenated styrene or divinyl benzene; glycidyl esters of fatty acids containing, for instance, 6-24 carbon atoms; glycidyl (meth)acrylate; an epoxy compound having an isocyanurate group; an epoxidized polyalkadiene such as epoxidized polybutadiene; hydantoin-epoxy resins; epoxy resins obtained by epoxidizing aliphatic and/or cycloaliphatic alkenes, such as dipentene dioxide, dicyclopentadiene dioxide and vinyl cyclohexene dioxide and glycidyl groups-containing resins such as polyesters or polyurethanes containing one or more glycidyl groups per molecule, or mixtures of the above-envisaged epoxy resins. The epoxy resins are known to a man skilled in the art and need not be further described here. It is preferred that use should be made of a polymer of ethylenically unsaturated compounds containing epoxy groups, such as glycidyl(meth)acrylate, N-glycidyl (meth)acrylamide and/or allyl glycidyl ether, and optionally one or more other copolymerizable, ethylenically unsaturated monomers. These (co)polymers may be prepared by usual polymerization techniques, use being made of initiators such as UV light, azo compounds such as azobisisobutyronitrile, azobisisovaleronitrile, aromatic peroxides such as benzoyl peroxide, tertiary butyl perbenzoate and (cyclo) aliphatic peroxides such as cumene hydroperoxide. The copolymers may be stabilized with inhibitors such as hydroquinone, the methyl ether of hydroquinone and benzoquinone.

Examples of other compounds having at least two $\alpha,\beta$-ethylenically unsaturated groups include unsaturated polyester resins based on maleic acid or fumaric acid or a derivative thereof. Such resins are usually prepared by bringing fumaric acid or maleic acid, alkyl esters of these acids or maleic anhydride, in combination or not with a saturated polycarboxylic acid, such as phthalic acid, isophthalic acid or adipic acid, into reaction with di- or polyvalent polyols, such as ethane diol, propane diol, neopentyl glycol, glycerol, trimethylol propane and pentaerythritil or epoxy groups-containing compounds, for instance the diglycidyl ether of Bisphenol-A. Such resins are described in, e.g., "Polyesters and their Applications", Bjorksten Research Laboratories Inc., Reinhold Publishing Corp., New York, pp. 21-27. Other suitable compounds are those where in the above-envisaged (meth)acryloyl compounds the (meth)acrylic acid is entirely or in part replaced with some other $\alpha,\beta$-ethylenically unsaturated monocarboxylic acid, such as cinnamic acid. The poly(meth)acrylol compound generally has a molecular weight of about 290-15,000, preferably 800-10,000.

The polyamino amide which according to the invention may be used as second component of the composition is obtained by reacting a mono- and/or dicarboxylic acid having 2-40 carbon atoms and a polyamine having 2-6 primary amino groups and 2-20 carbon atoms.

Examples of suitable monocarboxylic acids, which preferably contain 1-24 carbon atoms, include acetic acid, propionic acid, valeric acid, capronic acid, trimethyl acetic acid, caprylic acid, pelargonic acid, isooctanoic acid, lauric acid, myristic acid, palmitic acid, stearic acid, behenic acid or cerotic acid; aliphatic monocarboxylic acids having one or more conjugated or non-conjugated double C—C bonds, which generally contain 5-24 carbon atoms, such as linseed oil fatty acid, safflower oil fatty acid, soybean oil fatty acid, tall oil fatty acid, wood oil fatty acid, sunflower oil fatty acid, castor oil fatty acid, oiticica oil fatty acid, dehydrated castor oil fatty acid, linoleic acid, linolenic acid, oleic acid, sorbic acid, elaidic acid, $\alpha$-eleostearic acid, $\beta$-eleostearic acid, ricinolic acid, erucic acid, isanic acid or isanolic acid; cycloaliphatic monocarboxylic acids such as cyclopentane monocarboxylic acid, cyclopentane propionic acid and cyclohexane monocarboxylic acid; and aromatic monocarboxylic acids such as benzoic acid and p.tert. butyl benzoic acid.

As examples of suitable dicarboxylic acids, which preferably contain 8-36 carbon atoms, may be mentioned aliphatic dicarboxylic acids such as oxalic acid, malonic acid, succinic acid, glutaric acid, adipic acid, azelaic acid, 2,2,4-trimethyl adipic acid, sebacic acid, dimeric fatty acids generally containing 36 carbon atoms; cycloaliphatic dicarboxylic acids such as hexahydrophthalic acid, hexahydroterephthalic acid, tetrahydrophthalic acid, endomethylene tetrahydrophthalic acid or methylcyclohexane-1,2-dicarboxylic acid; and aromatic dicarboxylic acids such as orthophthalic acid, isophthalic acid or terephthalic acid. Also suitable are, of course, mixtures of the above-envisaged mono- and/or divalent carboxylic acids. In addition to the above-mentioned carboxylic acids other carboxylic acids may be used, such as trimellitic acid, and trimerised fatty acids, which acids may be employed in a relatively small amount of not higher than, for instance 30% by weight, preferably less than 10% by weight, calculated on the total amount of carboxylic acid.

The carboxylic acids may, if desired, contain inert substituents, for instance: halogen, nitro, aceto, or alkyl ether groups. If desired, the above-envisaged acids also may be used as anhydride or acid halide, or in the form of an ester, for instance an ester derived from an alcohol having 1 to 6 carbon atoms.

Polyamines from which according to the invention the polyamino amide is partly built up are polyamines having 2-6 primary and 0-6 secondary amino groups, preferably 2-3 primary and 0-4 secondary amino groups. Examples of suitable polyamines are 3-amino-1-(methylamino)propane, 3-amino-1-(cyclohexylamino)propane, N-(2-hydroxyethyl)ethylene diamine, more particularly polyamines of the formula

$$H_2N-(R_2-NH)_n-R_1-NH_2,$$

wherein the group $R_1$ and the n groups $R_2$ may be the same or different and represent an alkylene group having 2-6 carbon atoms and preferably 2-4 carbon atoms and n is a number from 1-6, preferably 1-3. By an alkylene group is also to be understood here a cycloalkylene group or an alkylene group having an ether-oxygen atom. Representative polyalkylene polyamines include diethylene triamine, dipropylene triamine, dibutylene triamine, dihexylene triamine, triethylene tetramine, tetraethylene pentamine, tetrapropylene pentamine, pentaethylene hexamine or polyamino compounds having different alkylene groups in a molecule, for instance:

$$H_2N(CH_2)_2NH(CH_2)_3NH_2,$$

$$H_2N(CH_2)_3NH(CH_2)_2NH(CH_2)_3NH_2$$

and

$$H_2N(CH_2)_3NH(CH_2)_2NH(CH_2)_2NH(CH_2)_3NH_2,$$

or mixtures of the above-envisaged compounds. The two last-mentioned compounds may be prepared for instance by addition of ethylene diamine or diethylene triamine to acrylonitrile, followed by hydrogenation of the product thus prepared.

Preferred polyamines from which according to the invention the polyamino amide is also partly built up are aliphatic, cycloaliphatic or aromatic amino compounds having 2 or 3 exclusively primary amino groups. Examples of such polyamines include ethylene diamine, propylene diamine, butylene diamine, pentamethylene diamine, hexamethylene diamine, decamethylene diamine, 4,7-dioxadecane-1,10-diamine, dodecamethylene diamine, 4,9-dioxadodecane-1,12-diamine, 7-methyl-4,10-dioxatridecane-1,13-diamine, 1,2-diamino cyclohexane, 1,4-diamino cyclohexane, 4,4'-diamino dicyclohexyl methane, bis-(3-methyl-4-amino cyclohexyl)methane, 2,2-bis-(4-amino cyclohexyl)propane, (3-methyl-4-amino cyclohexyl)-(3-methyl-4-amino phenyl)methane, 4,4'-diamino diphenyl methane, diamino diphenyl sulphone, bis(3-methyl-4-aminophenyl)methane and bis-(3-amino propyl)methylamine.

The polyamino amide may be prepared in any well-known or convenient manner from the mono- and/or dicarboxylic acid and one or more polyamines, for instance by reacting the reaction components with each other at a temperature generally of 100°-220° C., preferably 115°-190° C. Usually, no solvent is applied, but it is self-evident that one or more solvents, for instance methanol, may optionally be employed. In the reaction mixture the carboxylic acid is usually present in an amount such that according to the invention a polyamino amide having an amine number of 60-1000, preferably of 80-750 and more particularly of 200-600 is obtained.

These polyamino amides also may be applied as adduct to a compound having one or more epoxy groups. To prolong the pot life the polyamino amides may optionally be applied in the form of the ketimine or aldimine of the polyamino amide with ketones such as methylethyl ketone, diethyl ketone, methylisobutyl ketone or methylamyl ketone, or aldehydes, such as formaldehyde, acetaldehyde or isobutyraldehyde.

In addition to the polyamino amide still other amino compounds may be present. As examples of such amino compounds, which are preferably used in aldiminated or ketiminated form may be mentioned aliphatic or cycloaliphatic amines having at least one, preferably 2 to 4, primary amino groups and 2-24 carbon atoms and a molecular weight not higher than 580. It is preferred that these amines should have 0-6 secondary amino groups. Examples of suitable amino compounds include ethylene diamine, propylene diamine, ethanolamine, propanolamine, butylene diamine, pentamethylene diamine, hexamethylene diamine, decamethylene diamine, 4,6-dioxadecane-1,10-diamine, dodecamethylene diamine, 4,9-dioxadodecane-1,12-diamine, 7-methyl-4,10-dioxatridecane-1,13-diamine, 1,2-diaminocyclohexane, 1,4-diaminocyclohexane, 4,4'-diaminodicyclohexyl methane, isophorone diamine, bis-(3-methyl-4-aminocyclohexyl)methane, 2,2-bis-(4-aminocyclohexyl)propane, nitrile tris(ethane amine), polyether polyamines, for instance those that are known under the trade mark Jeffamine of Jefferson Chemical Company, bis-(3-aminopropyl)methylamine, 3-amino-1-(methylamino)propane, 3-amino-1-(cyclohexylamino)propane, N-(2-hydroxyethyl)ethylene diamine and polyamines of the formula $H_2N—(R_2—NH)_n—R_1—NH_2$, wherein the group $R_1$ and the n groups $R_2$ may be the same or different and represent an alkylene group containing 2-6, and preferably 2-4 carbon atoms and n is a number from 1-6 and preferably 1-3. By an alkylene group is also to be understood here a cycloalkylene group or an alkylene group containing an ether-oxygen atom. Examples of representative polyalkylene polyamines include diethylene triamine, dipropylene triamine and dibutylene triamine. Other suitable amino compounds are adducts of a polyamine or a hydroxylamine to a monoepoxy compound, a monoisocyanate or a monofunctional $\alpha,\beta$-ethylenically unsaturated carbonyl compound.

Other suitable amino compounds which may optionally be used are adducts of a di- or polyvalent epoxy or isocyanate compound or $\alpha,\beta$-ethylenically unsaturated carbonyl compound and an amino compound containing at least 1 primary amino group and a group reacting with the di- or polyvalent compound. The polyfunctional compounds referred to here may be identical with those mentioned hereinbefore as starting compounds for the poly(meth)acryloyl compound. But there is of course no need for the same polyfunctional compound to be used as starting compound for both the poly(meth)acryloyl compound and the amino compound. As to those polyfunctional compounds, reference is made to the foregoing. The $\alpha,\beta$-ethylenically unsaturated compound to be used with the amino compound in the formation of the adduct is preferably a poly(meth)acryloyl compound mentioned hereinbefore; alternatively, use may be made of a compound having one or more $\alpha,\beta$-ethylenically unsaturated dicarboxylic acid units, such as maleic acid or fumaric acid or an ester thereof.

The amino compounds that are used in the formation of the adduct thereof to the polyfunctional epoxy compound or isocyanate compound or $\alpha,\beta$-ethylenically unsaturated carbonyl compound may preferably be the afore-mentioned amino compounds containing 2-24 carbon atoms or, optionally, monoamines, preferably primary monoamines which have a group, for instance a hydroxyl group or mercaptan group, reacting with an epoxy compound or isocyanate compound or an $\alpha,\beta$-ethylenically unsaturated carbonyl compound.

It is preferred that use should be made of a mixture of a polyamino amide and an amino compound in which the amount of the polyamino amide is at least 3, and preferably at least 5 equivalent %. The polyamino amide is preferably used in the non-blocked form and the amino compound in the blocked form.

For use in the coating composition according to the invention the amino groups of the afore described amino compounds may be blocked with an aldehyde or ketone containing not more than 10 carbon atoms, preferably 3-8 carbon atoms. Examples of suitable blocking agents for the amino groups include acetone, methylethyl ketone, diethyl ketone, methylisopropyl ketone, methylisobutyl ketone, isobutyraldehyde, cyclohexanone, ethylamyl ketone, diisobutyl ketone, 3-octanone and decanone. It is preferred that use should be made of an aliphatic or cycloaliphatic ketone, more particularly containing 3-8 carbon atoms.

An effective method of preparing the above-envisaged blocked amino compound is, for example, the addition reaction of the epoxy or isocyanate compound or the $\alpha,\beta$-ethylenically unsaturated carbonyl compound referred to hereinbefore and an amino-, hydroxyl- or mercaptan-functional ketimine or aldimine. Optionally, the amino group(s) may be blocked after the addition reaction. The blocking of amino groups is known per se and need not be further described here.

In the coating composition according to the invention the poly(meth)acryloyl compound, the polyamino amide and possibly the amino compound are usually present in amounts such that the ratio of the number of equivalents of ethylenically unsaturated double bonds to the number of equivalents of amine hydrogen is in the range of 0.3 to 3.0, preferably of ½ to 2.

According to the invention the aqueous composition also contains a nitroalkane, a formic acid ester and/or a certain organic compound occurring in at least 2 tautomeric forms, and in one of the tautomeric forms a labile hydrogen atom is linked to a carbon atom. For brevity, these last-mentioned compounds are hereinafter referred to as CH acid. It has surprisingly been found that the compounds referred to hereinbefore exert an emulsifying action on the present binder system containing a polyamino amide, providing an excellent dispersibility of the binder system in water.

Examples of CH acids include 2,4-pentanedione, 1,1,1-trifluoro-2,4 pentanedione, phenylsulphonyl-propanone-2, 3-methyl-2,4-pentanedione, and esters, for instance those of a (cyclo)aliphatic or aromatic hydroxyl compound having 1-10 carbon atoms, such as methanol, ethanol, butanol, hexanol, cyclohexanol, phenol, ethylene glycol, glycerol, trimethylol ethane and trimethylol propane, and a carboxylic acid, such as nitroacetic acid, cyanoacetic acid, trifluoroacetic acid, acetyl acetic acid or malonic acid. Examples of suitable esters include ethyl nitroacetate, cyclohexyl nitroacetate, benzyl cyanoacetate, ethyl trifluoroacetoacetate, methyl acetoacetate, ethyl acetoacetate, phenyl acetoacetate and diethyl malonate. It is preferred that use should be made of 2,4-pentanedione, methyl acetoacetate or ethyl acetoacetate or methyl cyanoacetate. The CH acid generally has a pka of 3-12, preferably 4-11 and more particularly of 6½-9.

It is preferred that the formic acid ester should be an ester of formic acid and a monovalent alcohol having 1-6, more particularly 1-5 carbon atoms. Examples of suitable alcohols include methanol, ethanol, n-propanol, isopropanol, n-butanol, isobutanol, n-pentanol, isopentanol and ether alcohols such as 2-ethoxyethanol, 2-propoxyethanol and 2-butoxyethanol. More particularly, the ester is a formic acid ester of the general formula

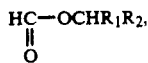

wherein $R_1$ and $R_2$ may be the same or different and represent a hydrogen atom or an alkyl group, the groups $R_1$ and $R_2$ together containing not more than 5 carbon atoms. A specially preferred ester is methyl formiate, ethyl formiate or isopropyl formiate. Other suitable esters are the esters of formic acid and a bi- or polyvalent hydroxy compound having 2-8 carbon atoms. As examples of suitable hydroxy compounds may be mentioned ethylene glycol, propylene glycol, glycerol, trimethylol propane and pentaerythritol. Optionally, the formic acid ester may contain one or more hydroxyl groups. It is preferred that the formic acid ester should have a solubility of 0.2-50 g, more particularly 0.5-35 g in 100 g of water having a temperature of 20° C.

The CH acid is usually employed in an amount such that per N atom of the amino group-containing curing agent 0.3-2 labile H atoms of the CH acid are present.

Suitable nitroalkanes have 1 to 6, and preferably 1-4 carbon atoms and contain one or two nitro groups. As examples may be mentioned nitromethane, nitroethane, 1- and 2-nitropropane, 1- and 2-nitrobutane and 1,3-dinitropropane. It is preferred that nitroethane or nitropropane should be applied. The formic acid ester is generally present in an amount such that 0.3-2 equivalents of formiate are present per equivalent of nitrogen of the amino group-containing curing agent.

The aqueous coating compositions may be formed from the (meth)acryloyl groups-containing compound, the polyamino amide and the nitroalkane, formic acid ester and/or CH acid in any convenient manner. It is preferred that the (meth)acryloyl groups-containing compound should be dissolved in an appropriate organic solvent and subsequently mixed with a solution of the polyamino amide in an appropriate organic solvent. In actual practice the nitroalkane, formic acid ester and/or the CH acid is either added to the solution of the (meth)acryloyl groups-containing compound or to the common solution of the (meth)acryloyl groups-containing compound and the polyamino amide.

To obtain the desired application viscosity water is added to the final solution. The aqueous composition may contain the usual additives, such as pigments, fillers, levelling agents, foam suppressing agents, rheology control agents, corrosion inhibitors and inert organic solvents, such as an aliphatic or aromatic hydrocarbon, and compounds such as butyl glycol. Optionally, pigment may previously be mixed with a solution of the binder or a component thereof in an organic solvent.

The coating composition ready for use generally contains water in an amount of at least 15% by weight, preferably at least 25% by weight and generally not more than 80% by weight.

The coating composition may be applied to the substrate in any suitable manner, such as by roller coating, spraying, brushing, sprinkling, flow coating or dipping. It is preferred that the composition should be applied by (electrostatic) spraying. The invention also pertains to a process of coating a substrate using the aqueous compositions referred to hereinbefore.

The substrate may be of, for instance, a metal such as aluminium, magnesium, steel, iron, titanium; of a synthetic material such as a fibre-reinforced epoxy resin, polyether-ether ketone, polyimide or polyester; or concrete or asbestos cement. The substrate may or may not have been pretreated. The coating is generally cured at ambient or elevated temperature, for instance up to not higher than 80° C. The coating thickness (after curing) is generally in the range of 10-200 μm. The coating composition according to the invention is harmless to the environment and hard curing, and after curing it is excellently resistant to organic solvents such as petrol, and to water. The composition can be excellently used as primer or top coat in the automobile and car repair industry, as decorative coat on concrete and as abrasion resistant coat on wood or concrete.

The invention will be further described in the following examples, which are not to be construed as limiting the scope of the present invention. The term "parts" used therein refers to "parts by weight" and "%" to "per cent by weight". The coating thickness of the compositions was determined after the composition had been cured. The resistance of the coating to water and premium grade petrol was determined after 1 week's drying by placing on a panel a wad of cotton wool soaked with water for 2 hours or with premium grade petrol for 2 minutes, after which the appearance was visually assessed for hazing and decrease in hardness by scratching with a pencil of a 2B hardness. When no hazing or decrease in hardness is found, the result is rated "excellent". The result is rated "very good", when no decrease in hardness, but only slight hazing is observed, and the result is rated "good", when besides slight hazing a slight reduction in hardness is established which, however, will have disappeared after drying of the coating.

Preparation of (meth)acryloyl compounds A-E (Meth)acryloyl compound A

Into a reactor were charged 350 g of xylene, which were heated to boiling temperature. Subsequently, 280.0 g of glycidyl methacrylate, 387.1 g of styrene, 32.9 g of butyl acrylate and 30.8 g of tert.butyl perbenzoate were added over a period of 3 hours. The reaction mixture was kept at boiling temperature until a conversion of more than 98% had been attained. Then 39 g of xylene were added. To the copolymer thus prepared were added 129.1 g of acrylic acid, 1.2 g of hydroquinone and 0.45 g of triphenyl phosphine. The resulting reaction mixture was heated to a temperature of 110° C., with air being passed through. The temperature was kept at 110° C. until the acid number of the mixture had decreased to below 2. Next, 272 g of xylene and 73 g of n-butanol were added. A 53.0%-solution of the (meth)acryloyl compound A was obtained having an acid number of 0.9 and a viscosity of 176 cPas.

(Meth)acryloyl compound B

Into a reactor were charged 1100 g of a hydrocarbon mixture (available under the trade mark Solvesso 100 of Esso) and 1100 g of white spirit having a boiling point of 110°-165° C. and heated to boiling temperature. Over a period of 3 hours there were subsequently added a mixture of 1100 g of glycidyl methacrylate, 1067.9 g of styrene, 1067.9 g of methyl methacrylate and 1164.6 g of lauryl methacrylate and a mixture of 660 g of xylene and 304.0 g of tert.butyl perbenzoate. Subsequently, 44 g of xylene were added and the reaction mixture was kept at boiling temperature until a conversion of over 98% was reached.

To the copolymer prepared were added 485.0 g of acrylic acid, 8.7 g of hydroquinone and 1.6 g of chromium (III)-2-ethyl hexanoate and the resulting mixture was heated to a temperature of 110° C., with air being passed through. The temperature was kept at 110° C. until an acid number of less than 2 was reached. Subsequently, 1000 g of butyl acetate were added and a 55.9%-solution of the (meth)acryloyl compound B was obtained having an acid number of 2 and a viscosity of 66.5 cPas.

(Meth)acryloyl compound C

Into a reactor were successively charged 500.0 g of pentaerithritol triacrylate, 165.4 g of isophorone diisocyanate, 222 g of toluene, 0.41 g of hydroquinone and a few drops of dibutyltin dilaurate and heated to a temperature of 60° C., with air being passed through the mixture. The reaction mixture was kept at 60° C. until the isocyanate content was less than 0.1%. Obtained was a 75%-solution of the (meth)acryloyl compound C having an acid number of 0.2 and a viscosity of 548 cPas.

(Meth)acryloyl compound D

Into a reactor were successively charged 4275 g of bisglycidyl ether of Bisphenol A (available under the trade mark Epikote 828 of Shell Chemical), 2.0 g of chromium (III)-2-ethyl hexanoate and 2.4 g of hydroquinone. To the resulting mixture were added 158 g of a mixture of 1526 g of acrylic acid, 5.6 g of chromium (III)-2-ethyl hexanoate and 3.0 g of hydroquinone and the mixture thus obtained was heated to a temperature of 110° C., with air being passed through. After a temperature of 110° C. had been attained, the remainder of the mixture was added over a period of 4.5 hours. The reaction mixture was kept at 110° C. until the acid number was below 5. Subsequently, 400 g of the diacrylic ester of Bisphenol A were added. Obtained was a (meth)acryloyl compound D having an acid number of 0.7 and a viscosity of 10000 cPas.

(Meth)acryloyl compound E

Into a reactor were charged 363 g of butyl acetate, 1650.0 g of an isocyanate trimer of hexamethylene diisocyanate (available under the trade mark Desmodur N 3390 of Bayer), 2.1 g of hydroquinone and a few drops of dibutyltin dilaurate and heated to a temperature of 60° C., with air being passed through. Subsequently, over a period of 1 hour 637.6 g of hydroxybutyl acrylate were added, followed by 2.1 g of hydroquinone. After an isocyanate content of 4.7% was obtained, 667.0 g of an 80%-polyester solution in a mixture of equal parts by weight of xylene and butyl acetate were added. The polyester had been prepared from 3735.8 g of neopentyl glycol, 1770.4 g of phthalic anhydride and 993.8 g of isophthalic acid. The polyester had an acid number of 2.7 and a hydroxyl number of 254. The reaction mixture was kept at 60° C. until an isocyanate content of less than 0.1% was obtained. Subsequently, 291 g of butyl acetate and 820 g of xylene were added. Of the (meth)acryloyl compound E a 60.4% solution was obtained having a viscosity of 275 cPas.

Blocked polyamino amides A-C

As blocked polyamino amide A is used in the Examples the polyketimine built up from methylisobutyl ketone and a polyamino amide having an amine number of 345-370 (available under the trade mark Versamid 125 of Schering). The polyketimine had an equivalent weight of 325.5, calculated on solid constituents.

As blocked polyamino amide B is used the polyketimine built up from methylisobutyl ketone and a polyamino amide having an amine number of 80-110 (available under the trade mark Euredur 424 of Schering). The polyketimine has an equivalent weight of 1269, calculated on solid constituents.

As blocked polyamino amide C is used the polyketimine built up from hexanone and a polyamino amide having an amine number of 170 (available under the trade mark Epilink 175 of Akzo Chemie). The polyketimine has a viscosity of 70 cPas.

Blocked amino compounds D and E

As blocked amino compound D is used the polyketimine built up from methylisobutyl ketone and 3,3'-dimethyl-4,4'-diamino-dicyclohexyl methane. The polyketimine has an equivalent weight of 213, calculated on solid constituents.

Preparation of blocked amino compound E

Into a reactor there were successively charged under an atmosphere of nitrogen 196.5 g of dipropylene triamine, 330 g of methylisobutyl ketone, 132 g of toluene and 2.0 g of formic acid, followed by heating to boiling temperature, the reaction water evolved being removed by azeotropic distillation. After 20 hours 53.9 g of water (obtained in 99.8% of the theoretical yield) were collected. The resulting solution was cooled to 60° C., after which a solution in 447 g of toluene of 297.7 g of a diglycidylether of Bisphenol A (available under the trade mark Epikote 828 of Shell Chemical) was added over a period of 2 hours. This reaction mixture was kept at a temperature of 60° C. for 4 hours. The resulting solution of the blocked amino compound E was cooled, after which it was stored without being purified.

EXAMPLES 1-17

EXAMPLE 1

A coating composition was prepared by successively mixing 53.96 g of (meth)acryloyl compound A, 6.48 g of a polyamino amide having an amine number of 80–110 (available under the trade mark Euredur 424 of Schering), 5.40 g of blocked amino compound D and 7.19 g of acetyl acetone. To this mixture were added, with stirring, 27.0 g of water. The resulting composition had a solids content of 39.4%, an inversion point at a water content of 25% and a gel time of 55 minutes. The composition was applied to a steel panel in a coating thickness of 80 $\mu$m and dried at an ambient temperature of 20° C. and a relative humidity of 70%. The coating applied was dust dry after 1 hour and handleable after 2½ hours. The Persoz hardness was 86 seconds after 1 day and 216 seconds after 1 week. The coating was very well resistant to water and excellently resistant to premium grade petrol.

EXAMPLE 2

A coating composition was prepared by successively mixing 43.35 g of (meth)acryloyl compound A, 20.52 g of blocked amino compound C and 4.34 g of nitro ethane. To this mixture were added, with stirring, 31.8 g of water. The resulting composition had a solids content of 39.1%, an inversion point at a water content of 28.9% and a gel time of 8 minutes. The composition was applied to a steel panel in a thickness of 68 $\mu$m and dried at an ambient temperature of 20° C. and a relatively humidity of 70%. The coating applied was dust dry after ½ hour and handleable after 1 hour. The Persoz hardness was 87 seconds after 1 day and 119 seconds after 1 week. The coating was very well resistant to water and excellently resistant to premium grade petrol.

EXAMPLE 3

A coating composition was prepared by successively mixing 42.02 g of (meth)acryloyl compound B, 21.57 g of a polyamino amide having an amine number of 80–110 (available under the trade mark Euredur 424 of Schering) and 5.60 g of methyl cyanoacetate. Subsequently, 30.8 g of water were added, with stirring. The resulting composition had a solids content of 36.6%, an inversion point at 22.4% water content and a gel time of 15 minutes. The composition was applied to a steel panel in a coating thickness of 93 $\mu$m and dried at an ambient temperature of 20° C. and a relative humidity of 70%. The coating applied was dust dry after ¾ hours and handleable after 1½ hours. The Persoz hardness was 70 seconds after 1 day and 97 seconds after 1 week. The coating was well resistant to water and to premium grade petrol.

EXAMPLE 4

A coating composition was prepared by successively mixing 53.57 g of (meth)acryloyl compound B, 20.71 g of a polyamino amide having an amine number of 80–110 (available under the trade mark Euredur 424 of Schering) and 3.57 g of nitroethane. Subsequently, 32.2 g of water were added, with stirring. The resulting composition had a solids content of 38.3%, an inversion point at 21.4% water content and a gel time of 35 minutes. The composition was applied to a steel panel in a coating thickness of 75 $\mu$m and dried at an ambient temperature of 20° C. and a relative humidity of 70%. The coating applied was dust dry after ½ hour and handleable after 2 hours. The Persoz hardness was 33 seconds after 1 day and 96 seconds after 1 week. The coating was very well resistant to water and well resistant to premium grade petrol.

EXAMPLE 5

A coating composition was prepared by successively mixing 44.5 g of (meth)acryloyl compound B, 6.23 g of a polyamino amide having an amine number of 80–110 (available under the trade mark Euredur 424 of Schering), 10.09 g of blocked polyamino amide, 1.78 g of acetyl acetone and 1.78 g methyl cyanoacetate.

Subsequently, 35.6 g of water were added, with stirring. The resulting composition had a solids content of 37.8%, an inversion point at 26.7% water content and a gel time of 40 minutes. The composition was applied to a steel panel in a coating thickness of 68 $\mu$m and dried at an ambient temperature of 20° C. and a relative humidity of 70%. The coating applied was dust dry after ½ hour and handleable after 2 hours. The Persoz hardness was 76 seconds after 1 day and 82 seconds after 1 week. The coating was very well resistant to water and to premium grade petrol.

EXAMPLE 6

A coating composition was prepared by successively mixing 51.90 g of (meth)acryloyl compound B, 13.80 g of a polyamino amide having an amine number of 80–110 (available under the trade mark Euredur 424 of Schering) 2.50 g of 3,3'-dimethyl-4,4'-diaminodicyclohexyl methane and 5.80 g of nitroethane. Subsequently, 26.1 g of water were added, with stirring. The resulting composition had a solids content of 42.1%, an inversion point at 24.3% water content and a gel time of 15 minutes. The composition was applied to a steel panel in a coating thickness of 69 $\mu$m and dried at an ambient temperature of 20° C. and a relative humidity of 70%. The coating applied was dust dry after ¾ hours and handleable after 1¼ hours. The Persoz hardness was 68 seconds after 1 day and 143 seconds after 1 week. The coating was very well resistant to water and to premium grade petrol.

EXAMPLE 7

A coating composition was prepared by successively mixing 46.15 g of (meth)acryloyl compound C, 9.23 g of a polyamino amide having an amine number of 370–410 (available under the trade mark Versamid 140 of Schering) and 4.61 g of nitroethane. Subsequently, 40.0 g of water were added, with stirring. The resulting composition had a solids content of 41.5%, an inversion point at 30.8% water content and a gel time of 5 minutes. The composition was applied to a steel panel in a coating thickness of 71 μm and dried at an ambient temperature of 20° C. and a relative humidity of 70%. The coating applied was dust dry after ½ hour and handleable after ¾ hours. The Persoz hardness was 33 seconds after 1 day and 66 seconds after 1 week. The coating was very well resistant to water and excellently resistant to premium grade petrol.

EXAMPLE 8

A coating composition was prepared by successively mixing 49.67 g of (meth)acryloyl compound D, 9.60 g of a polyamino amide having an amine number of 80-110 (available under the trade mark Euredur 424 of Schering), 12.58 g of blocked polyamino compound D and 4.97 g of nitroethane. Subsequently, 23.2 g of water were added, with stirring. The resulting composition had a solids content of 54.6%, an inversion point at 16.6% water content and a gel time of 15 minutes. The composition was applied to a steel panel in a coating thickness of 82 μm and dried at an ambient temperature of 20° C. and a relative humidity of 70%. The coating applied was dust dry after 1½ hours and handleable after 4 hours. The Persoz hardness was 13 seconds after 1 day and 27 seconds after 1 week. The coating was well resistant to water and very well resistant to premium grade petrol.

EXAMPLE 9

A coating composition was prepared by successively mixing 42.98 g of (meth)acryloyl compound E, 16.91 g of blocked polyamino amide C, 1.00 g of acetyl acetone and 1.00 g of methyl cyanoacetate. To this mixture were added, with stirring, 34.4 g of water. The resulting composition had a solids content of 37.8%, an inversion point at a water content of 28.6% and a gel time of 40 minutes. The composition was applied to a steel panel in a thickness of 68 μm and dried at an ambient temperature of 20° C. and a relatively humidity of 70%. The coating applied was dust dry after 2 hours and handleable after 24 hours. The Persoz hardness was 11 seconds after 1 day and 21 seconds after 1 week. The coating was well resistant to water and excellently resistant to premium grade petrol.

EXAMPLE 10

A coating composition was prepared by successively mixing 42.6 g of (meth)acryloyl compound A, 11.40 g of a polyamino amide having an amine number of 80-110 (available under the trade mark Euredur 424 of Schering), 5.40 g of blocked polyamino compound E and 3.70 g of nitroethane. Subsequently, 36.9 g of water were added, with stirring. The resulting composition had a solids content of 31.6%, an inversion point at 31.3% water content and a gel time of 1 hour. The composition was applied to a steel panel in a coating thickness of 35 μm and dried at an ambient temperature of 20° C. and a relative humidity of 70%. The coating applied was dust dry after ½ hour and handleable after 2 hours. The Persoz hardness was 96 seconds after 1 day and 155 seconds after 1 week. The coating was very well resistant to water and to premium grade petrol.

EXAMPLE 11

A coating composition was prepared by successively mixing 48.50 g of (meth)acryloyl compound B, 25.90 g of blocked polyamino amide A and 2.90 g of nitroethane. To this mixture were added, with stirring, 22.7 g of water. The resulting composition had a solids content of 41.5%, an inversion point at a water content of 19.4% and a gel time of 1 hour. The composition was applied to a steel panel in a coating thickness of 48 μm and dried at an ambient temperature of 20° C. and a relative humidity of 70%. The coating applied was dust dry after 1 hour and handleable after 2½ hours. The Persoz hardness was 42 seconds after 1 day and 62 seconds after 1 week. The coating was well resistant to water and to premium grade petrol.

EXAMPLE 12

A coating composition was prepared by successively mixing 40.40 g of (meth)acryloyl compound E, 29.70 g of blocked polyamino amide B and 3.00 g of methyl cyanoacetate. To this mixture were added, with stirring, 26.9 g of water. The resulting composition had a solids content of 43.1%, an inversion point at a water content of 24.3% and a gel time of 4 hours. The composition was applied to a steel panel in a coating thickness of 54 μm and dried at an ambient temperature of 20° C. and a relative humidity of 70%. The coating applied was dust dry after 1½ hours and handleable after 3 hours. The Persoz hardness was 11 seconds after 1 day and 14 seconds after 1 week. The coating was well resistant to water and to premium grade petrol.

EXAMPLE 13

A coating composition was prepared by successively mixing 49.0 g of (meth)acryloyl compound B, 13.1 g of a polyamino amide having an amine number of 80-110 (available under the trade mark Euredur 424 of Schering) 2.6 g of blocked amino compound D and 2.6 g of methyl formiate. Subsequently, 32.7 g of water were added, with stirring. The resulting composition had a solids content of 40.0%, an inversion point at 24.5% water content and a gel time of 3 hours. The composition was applied to a steel panel in a coating thickness of 67 μm and dried at an ambient temperature of 20° C. and a relative humidity of 70%. The coating applied was dust-dry after 1 hour and handleable after 2 hours. The Persoz hardness was 43 seconds after 1 day and 107 seconds after 1 week. The coating was very well resistant to water and to premium grade petrol.

EXAMPLE 14

A coating composition was prepared by successively mixing 45.5 g of (meth)acryloyl compound B, 13.4 g of a blocked polyamino amide C and 2.7 g of ethyl formiate. Subsequently, 37.9 g of water were added, with stirring. The resulting composition had a solids content of 37.4%, an inversion point at 35.0% water content and a gel time of 150 minutes. The composition was applied to a steel panel in a coating thickness of 63 μm and dried at an ambient temperature of 20° C. and a relative humidity of 70%. The coating applied was dust-dry after 1 hour and handleable after 2 hours. The Persoz hardness was 48 seconds after 1 day and 100 seconds after 1 week. The coating was excellently resistant to water and well resistant to premium grade petrol.

EXAMPLE 15

A coating composition was prepared by successively mixing 39.5 g of (meth)acryloyl compound B, 23.7 g of blocked polyamino amide A, 6.6 g of butyl glycol and 2.5 g of isopropyl formiate. Subsequently, 26.3 g of water were added, with stirring. The resulting composition had a solids content of 39.8%, and inversion point at 25.0% water content and a gel time of 45 minutes. The composition was applied to a steel panel in a coating thickness of 51 μm and dried at an ambient temperature of 20° C. and a relative humidity of 70%. The coating applied was dust-dry after ½ hour and handleable after 1 hour. The Persoz hardness was 58 seconds after 1 day and 125 seconds after 2 week. The coating was excellently resistant to water and to premium grade petrol.

EXAMPLE 16

A coating composition was prepared by successively mixing 45.7 g of (meth)acryloyl compound D, 9.1 g of a polyamino amide having an amine number of 80–110 (available under the trade mark Euredur 424 of Schering), 9.1 g of 3,3'-dimethyl-4,4'-diaminodicyclohexyl methane and 5.5 g of isopropyl formate. Subsequently, 30.6 g of water were added, with stirring. The resulting composition had a solids content of 47.9%, an inversion point at 23.0% water content and a gel time of 30 minutes. The composition was applied to a steel panel in a coating thickness of 58 μm and dried at an ambient temperature of 20° C. and a relative humidity of 70%. The coating applied was dust-dry after ½ hour and handleable after 1½ hours. The Persoz hardness was 25 seconds after 1 day and 52 seconds after 1 week. The coating was well resistant to water and excellently resistant to premium grade petrol.

EXAMPLE 17

A coating composition was prepared by successively mixing 42.3 g of (meth)acryloyl compound E, 14.1 g of blocked polyamino amide B, 3.9 g of blocked amino compound E and 4.5 g of n-butyl formate. Subsequently, 35.2 g of water were added, with stirring. The resulting composition had a solids content of 34.0%, and inversion point at 27.0% water content and a gel time of 60 minutes. The composition was applied to a steel panel in a coating thickness of 47 μm and dried at an ambient temperature of 20° C. and a relative humidity of 70%. The coating applied was dust-dry after ½ hour and handleable after 1 hour. The Persoz hardness was 23 seconds after 1 day and 28 seconds after 1 week. The coating was well resistant to water and excellently resistant to premium grade petrol.

We claim:

1. An aqueous coating composition comprising:
   (a) an organic compound having at least 2×, β-ethylenically unsaturated carboxylate groups;
   (b) a curing agent comprising a polyamino amide having an amine number ranging from 60–1000 built up from a carboxylic acid selected from the group consisting of monocarboxylic acids, dicarboxylic acids and combinations thereof having 2–40 carbon atoms and a polyamine having 2–6 primary amino groups and 2–20 carbon atoms; and
   (c) a dispersing agent selected from the group consisting of a nitroalkane having 1–6 carbon atoms; an organic compound occurring in at least 2 tautomeric forms, and in one of the tautomeric forms a liabile hydrogen atom is linked to a carbon atom and which compound contains at least one carbonyl group or sulphonyl group; a formic acid ester having a solubility of at least 0.2 g in 100 g of water having a temperature of 20° C., with the exception of tert. butyl formiate; and combinations thereof.

2. The coating composition of claim 1 wherein the organic compound having α,β-ethylenically unsaturated carboxylate groups has a molecular weight in the range of about 290 to 15,000.

3. The coating composition of claim 2 wherein the organic compound has a molecular weight in the range of 800 to 10,000.

4. The coating composition of claim 1 wherein the polyamino amide is built up from a saturated aliphatic monocarboxylic acid having 1–24 carbon atoms.

5. The coating composition of claim 1 wherein the polyamino amide is built up from a dicarboxylic acid having 8–36 carbon atoms.

6. The coating composition of claim 1 wherein the polyamino amide is built up from a polyamine having 2–3 primary and 0–4 secondary amino groups.

7. The coating composition of claim 1 wherein the polyamino amide is built up from a polyamine of the formula

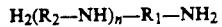

wherein the group $R_1$ and the n groups $R_2$ may be the same or different and represent an alkylene group having 2–6 carbon atoms and n is a number from 1–6.

8. The coating composition of claim 1 wherein the polyamino amide is built up from an aliphatic, cycloaliphatic or aromatic amino compound having 2 or 3 exclusively primary amino groups.

9. The coating composition of claim 1 wherein the polyamino amide has an amine number ranging from 80–750.

10. The coating composition of claim 9 wherein the polyamino amide has an amine number ranging from 200–600.

11. The coating composition of claim 1 wherein the polyamino amide is present as mixture of the polyamino amide and an amino compound in an amount of at least 3 equivalent %.

12. The coating composition of claim 11 wherein the polyamino amide is present in unblocked form and the amino compound in blocked form.

13. The coating composition of claim 1 wherein the organic compound having at least 2×, β-ethylenically unsaturated carboxylate groups, the polyamino amide and the amino compound, if any, are present in an amount such that the ratio of the number of equivalents of ethylenically unsaturated double bonds of the compound having carboxylate groups to the number of equivalents of amine hydrogen is in the range of 0.3 to 3.0.

14. The coating composition of claim 13 wherein the ratio is in the range of 0.5 to 2.0.

15. The coating composition of claim 1 wherein the nitroalkane has 1–4 carbon atoms.

16. The coating composition of claim 15 wherein the nitroalkane is nitroethane or nitropropane.

17. The coating composition of claim 1 wherein the organic compound which occurs in at least 2 tautomeric forms is 2,4-pentanedione, methyl acetoacetate, ethyl acetoacetate, or methyl cyanoacetate.

18. The coating composition of claim 1 wherein the formic acid ester is an ester of formic acid and a monovalent alcohol having 1–6 carbon atoms.

19. The coating composition of claim 18 wherein the formic acid ester is an ester of formic acid and a monovalent alcohol having 1-5 carbon atoms.

20. The coating composition of claim 1 wherein the formic acid ester is a formic ester of the general formula

wherein $R_1$ and $R_2$ are the same or different and represent a hydrogen atom or an alkyl group, the groups $R_1$ and $R_2$ together containing not more than 5 carbon atoms.

21. The coating composition of claim 1 wherein the formic acid ester is methyl formiate, ethyl formiate or isopropyl formiate.

22. The coating composition of claim 1 wherein the formic acid ester is an ester of formic acid and a bi- or polyvalent hydroxy compound having 2-8 carbon atoms.

23. The coating composition of claim 1 wherein the formic acid ester has a solubility of 0.2-50 g in 100 g water having a temperature of 20° C.

24. The coating composition of claim 23 wherein the formic acid ester has a solubility of 0.5-35 g in 100 g of water having a temperature of 20° C.

25. The coating composition of claim 1 wherein formic acid ester is present in an amount such that 0.3-2 equivalents are present per equivalent of nitrogen of the amino-group-containing curing agent.

26. The coating composition of claim 1 wherein water is present in an amount of at least 15% by weight.

27. The coating composition of claim 26 wherein water is present in an amount of at least 25% by weight.

28. The coating composition of claim 1 wherein water is present in an amount of not more than 80% by weight.

29. The coating composition of claim 1, wherein the organic compound containing $\alpha,\beta$-ethylenically unsaturated carboxylate groups is selected from the group consisting of the (meth)acrylic esters of di-, tri- or polyvalent polyols, adducts of a hydroxyl group-containing (meth)acrylic ester of a polyol to an at least bifunctional isocyanate compound, and adducts of (meth)acrylic acid to an at least bifunctional epoxy compound.

30. The coating composition of claim 29, wherein the organic compound containing $\alpha,\beta$-ethylenically unsaturated carboxylate groups is an adduct of an acrylic ester of a hydroxyl compound containing 2-6 hydroxyl groups and 2-10 carbon atoms and an at least bifunctional isocyanate compound.

31. The coating composition of claim 29, wherein the organic compound having $\alpha,\beta$-ethylenically unsaturated carboxylate groups is an adduct of a hydroxyl group-containing (meth)acrylic ester of a polyol to an at least bifunctional isocyanate compound.

32. The coating composition of claim 31, wherein the organic compound having $\alpha,\beta$-ethylenically unsaturated carboxylate groups is an adduct of trimethylol propane diacrylate or pentaerythritol triacrylate and an at least bifunctional isocyanate compound.

33. The coating composition of claim 31, wherein the organic compound having $\alpha,\beta$-ethylenically unsaturated carboxylate groups is an adduct of a hydroxyl group-containing (meth) acrylic ester of a polyol to an aliphatic or cycloaliphatic di-or triisocyanate having from about 8 to about 36 carbon atoms.

34. The coating composition of claim 29, wherein the organic compound having $\alpha,\beta$-ethylenically unsaturated carboxylate groups is an adduct of a (meth) acrylic acid and a polymer of ethylenically unsaturated compounds having epoxy groups.

* * * * *

UNITED STATES PATENT AND TRADEMARK OFFICE
CERTIFICATE OF CORRECTION

PATENT NO. : 5,266,630
DATED : November 30, 1993
INVENTOR(S) : NOOMEN, Arie et al It is certified that error appears in the above—identified patent and that said Letters Patent is hereby corrected as shown below:

Col. 15:
In Claim 1, line 51, please change "X" to --$\alpha$--;

Col. 16:
In Claim 13, line 47, please change "X" to --$\alpha$--.

Signed and Sealed this

Third Day of January, 1995

Attest:

BRUCE LEHMAN

Attesting Officer     Commissioner of Patents and Trademarks